(12) United States Patent
Wakamatsu

(10) Patent No.: US 7,814,347 B2
(45) Date of Patent: Oct. 12, 2010

(54) POWER SUPPLY DEVICE

(75) Inventor: Yoshinori Wakamatsu, Tokyo (JP)

(73) Assignee: Nec Corporation, Tokyo (JP)

( * ) Notice: Subject to any disclaimer, the term of this patent is extended or adjusted under 35 U.S.C. 154(b) by 883 days.

(21) Appl. No.: 11/703,111

(22) Filed: Feb. 7, 2007

(65) Prior Publication Data

US 2007/0208958 A1 Sep. 6, 2007

(30) Foreign Application Priority Data

Mar. 2, 2006 (JP) .............................. 2006-055771

(51) Int. Cl.
G06F 1/26 (2006.01)
G06F 13/00 (2006.01)
H02J 1/10 (2006.01)

(52) U.S. Cl. .......................... 713/300; 710/300; 307/18

(58) Field of Classification Search ................... 713/323
See application file for complete search history.

(56) References Cited

U.S. PATENT DOCUMENTS 6,014,319 A * 1/2000 Kuchta et al. ............... 361/788
6,154,802 A * 11/2000 Khosrowpour ............... 710/312
6,574,695 B1 6/2003 Mott et al.
6,633,996 B1 * 10/2003 Suffin et al. ..................... 714/4
6,737,763 B2 * 5/2004 Liu et al. ...................... 307/58
7,205,681 B2 * 4/2007 Nguyen ....................... 307/18

FOREIGN PATENT DOCUMENTS

| JP | 2003-519837 | 6/2003 |
| JP | 2004-126972 | 4/2004 |
| JP | 2005-011304 | 1/2005 |

OTHER PUBLICATIONS

Japanese Patent Office issued a Japanese Office Action dated Jan. 13, 2010, Application No. 2006-055771.

* cited by examiner

*Primary Examiner*—Thomas Lee
*Assistant Examiner*—Eric Chang
(74) *Attorney, Agent, or Firm*—Young & Thompson

(57) ABSTRACT

A power supply device which comprises at least two power supply units and the same number of adapter cards, each of the adaptor cards comprising a number of hot swap circuits at least equal to a number of the power supply units is disclosed. In the power supply device power from each of the at least two power supply units is supplied to a respective one of the hot swap circuits within each of the adapter cards.

7 Claims, 1 Drawing Sheet

POWER SUPPLY DEVICE

BACKGROUND OF THE INVENTION

1. Field of the Invention

This invention relates to a power supply device with a redundant structure and containing plural sets of power supply circuit units and adapter cards.

2. Description of the Related Art

A power supply as shown in FIG. 2 has been proposed for disk enclosure devices, although no publication of such system is known. The disk enclosure device (DES) 10' includes two power supply units (PS0, PS1) 7, 17, two adapter cards (ADP0, ADP1) 41', 42' and a backboard (BB) 8'. The backboard (BB) 8' is interposed between the power supply units (PS0, PS1) 7, 17 and adapter cards (ADP0, ADP1) 41', 42' and respectively connected to each of them by the connectors 9, 19, 20', 30'. This structure allows the operation to continue even if one unit among the power supply units (PS0, PS1) 7, 17 and adapter cards (ADP0, ADP1) 41', 42' breaks down. In other words, the disk enclosure device possesses a redundant structure to ensure a stable supply of power.

More specifically, a power supply unit (PS0) 7 and a backboard (BB) 8' are connected by a connector 9; a power supply unit (PS1) 17 and a backboard (BB) 8' are connected by a connector 19; an adapter card (ADP0) 41' and a backboard (BB) 8' are connected by a connector 20'; and an adapter card (ADP1) 42' and a backboard (BB) 8' are connected by a connector 30'. The backboard (BB) 8' has the power supply line pattern so that power is supplied from the power supply unit (PS0) 7 to both the adapter cards (ADP0, ADP1) 41', 42'; and power is supplied from the power supply unit (PS1) 17 to both the adapter cards (ADP0, ADP1) 41', 42' in the same way. In other words, the power supply line pattern on the backboard (BB) 8' includes a first linear pattern from the power supply unit (PS0) 7 to adapter card (ADP0) 41'; and a second linear pattern from the power supply unit (PS1) 17 to the adapter card (ADP1) 42'; and a third linear pattern intersecting these two linear patterns. The connectors 9, 19, 20', and 30' are here each utilized to make up one power supply line pattern from either a first or a second linear pattern.

The adapter card (ADP0) 41' is structured so that a hot swap circuit (Hot Swap0) 5, a diode 3, and a DC/DC converter (DD Con) 2 are each directly connected from the input side and the DC/DC converter (DD Con) 2 outputs the power supplied from the power supply line pattern on the backboard (BB) 8' via each component. The adapter card (ADP1) 42' is structured in the same way, with a hot swap circuit (Hot Swap0) 15, a diode 13, and a DC/DC converter (DD Con) 12 each directly connected from the input side and the DC/DC converter (DD Con) 12 outputs the power supplied from the power supply line pattern on the backboard (BB) 8' via each component.

In the disk enclosure device (DES) 10' with this type of structure, if an electrical short for example occurs between the power supply and GND (ground) due to a problem or breakdown for example in the adapter card (ADP0) 41', then the hot swap circuit (HOT SWAP0) 5 detects the excessive current and stops the output so that the adapter card (ADP0) 41' operation stops. It gives no effect, however, on the adapter card (ADP1) 42' and the power supply continues. Consequently, normal operation can continue. This continuation of normal operation is achieved since the entire device has a redundant structure.

In the case that an electrical short between the power supply and GND (ground) occurred in the same way due to a problem or breakdown for example in the adapter card (ADP1) 42', then the hot swap circuit (HOT SWAP0) 15 detects the excessive current and stops the output so that the adapter card (ADP1) 42' operation stops. This gives no effect however on the adapter card (ADP0) 41' and the supply of power continues. Consequently, normal operation can continue. This continuation of normal operation is achieved since the entire device has a redundant structure.

When an electrical short occurs between the power supply and GND due to a problem within the power supply unit (PS0) 7 stopping the output of the unit (PS0) 7, then the flow of current from the power supply unit (PS1) 17 can be prevented due to a diode mounted on the output of the power supply unit (PS0) 7 and the power supply unit (PS1) 17 continues to supply power. Consequently, normal operation can continue since the entire device has a redundant structure.

Even in the case that an electrical short occurs between the power supply and GND due to a problem within the power supply unit (PS1) 17 stopping the output of the unit (PS1) 17, the diode mounted on the output of the power supply unit (PS1) 17 prevents the inflow of current from the power supply unit (PS0) 7. And the power supply unit (PS0) 7 continues to supply power. Consequently, normal operation can continue since the entire device has a redundant structure.

The hot swap function for the hot swap circuits (HOT SWAP0) 5, 15 on the adapter cards (ADP0, ADP1) 41', 42' here is disclosed in the known art such as in JP-A No. 519837/2003 (see abstract), etc.

As shown in FIG. 2, the disk enclosure device (DES) 10' can continue to supply normal power when one of the two power supply units (PS0, PS1) 7, 17 and the adapter cards (ADP0, ADP1) 41', 42' becomes defective. However, when a pin in the connector 9 of the power supply unit (PS0) 7 or the connector 19 of the power supply unit (PS1) 17 for example becomes bent and an electrical short occurs between the power supply and GND, then power cannot be supplied and the entire disk enclosure device operation stops. The operation stops because both of the two power supply units (PS0, PS1) 7, 17 detect the excessive current and stop outputting power. So the supply of power to the adapter cards (ADP0, ADP1) 41', 42' ends. When in the same way, a pin become bent on the connector 20' of the adapter card (ADP0) 41' or on the connector 30' of the adapter card (ADP1) 42' causing an electrical short between the power supply and GND, then, again, the two power supply units (PS0, PS1) 7, 17 detect excessive current and the supply of power to the two adapter cards (ADP0, ADP1) 41', 42' stops. So the entire disk enclosure device operation stops.

In other words, the disk enclosure device (DES) 10' of the related art has the problem that when any of the connectors 9, 19, 20', 30' becomes defective between the two power supply units (PS0, PS1) 7, 17 and the adapter cards (ADP0, ADP1) 41', 42', and the backboard (BB) 8', and causes an electrical short between the power supply and GND, then the operation of the entire device stops. So the safe operation cannot be guaranteed.

SUMMARY OF THE INVENTION

This invention provides a power supply device capable of continuing operation of the entire device even when one of the connectors between the plural power supply units and the plural adapter cards, and the backboard become defective, causing an electrical short between the power supply and GND.

The power supply device of this invention is capable of supplying power from a separate power supply unit, to a different one of the redundant hot swap circuits in each of the plural adapter cards. This invention is therefore capable of continuing operation of the entire device or in other words, continuing to supply power, even when an electrical short has occurred between the power supply and GND caused for example by a bent pin in one of the connectors of the adapter cards or the connectors for the power supply circuit units using insertable/removable live wires.

According to the present invention, there is supplied a power supply device which comprises at least two power supply units and the same number of adapter cards, each of the adaptor cards comprising a number of hot swap circuits at least equal to a number of the power supply units, wherein power from each of the at least two power supply units is supplied to a respective one of the hot swap circuits within each of the adapter cards.

According to the present invention, there is supplied a disk enclosure device which comprises the power supply device descried above.

According to the present invention, there is supplied a power supply method which comprises, supplying power from each of at least two power supply units to a respective one of a number of hot swap circuits within each of a number of adapter cards, wherein the number of hot swap circuits within an adaptor card is greater than or equal to the number of power supply units and the number of adaptor cards is equal to the number of power supply units.

DETAILED DESCRIPTION OF THE INVENTION

Figure 1:
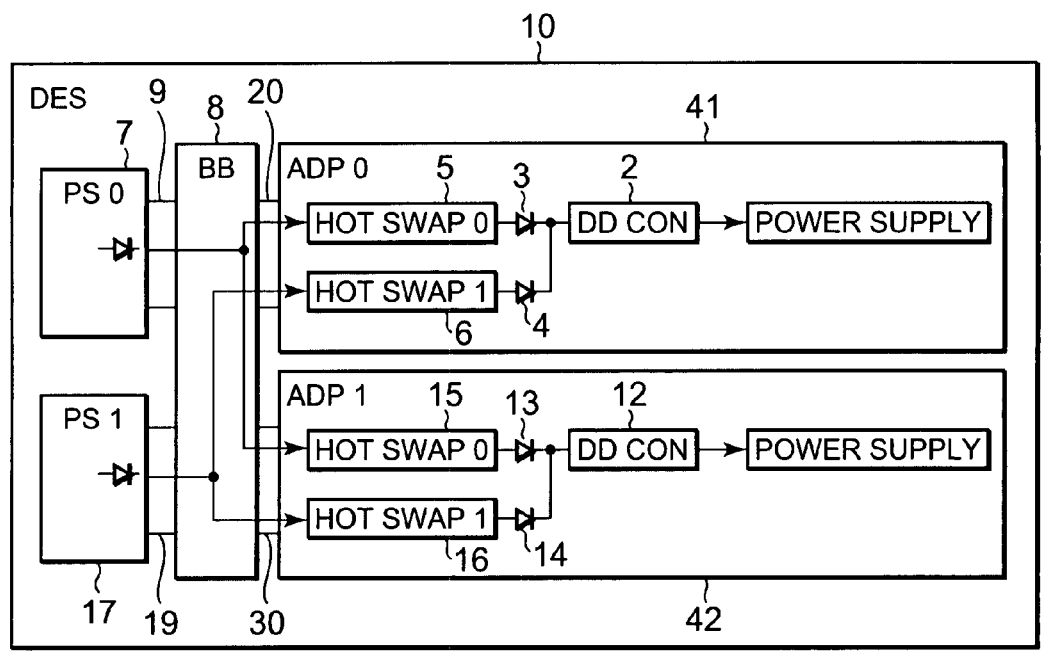
FIG. 1 is a circuit block diagram showing the basic structure of the power supply of an embodiment of this invention for use in disk enclosure devices.

The power supply device of the preferred embodiment of this invention utilizes a redundant structure including two power supply circuit units, two adapter cards, and one backboard connected to them, and connectors connecting between the backboard and each of those power supply circuit units and adapter cards. Moreover, the redundancy is increased by adding a pair of hot swap circuits on each of the two adapter cards. The backboard includes a power supply line pattern for a first power supply system for supplying power from one of the power supply circuit units to one of the pair of hot swap circuits on the two adapter cards; and a second power supply system for supplying power from the other power supply circuit unit to the other one of the pair of hot swap circuits on the two adapter cards. The power supply line pattern installed on the backboard therefore preferably starts from each power supply circuit and respectively branches to each of the two adapters.

Each of the connectors connecting between the power supply circuit and the backboard are used in one power supply system. However, each of the connectors that connect between the adapter cards and the backboard is utilized in the two power supply systems.

Diodes are also installed on the outputs of each of the pair of hot swap circuits for each of the adapter cards. Each of the diode outputs on the same adapter card is preferably mutually connected to the other output. The input side of the DC/DC converter, which carries out DC to DC conversion, for supplying the specified power is preferably connected to the output side of the diodes.

This embodiment of the power supply of this invention is described next in detail while referring to the drawings.

FIG. 1 is an overall circuit block diagram showing the basic structure when the power supply of this embodiment of this invention is utilized in a disk enclosure unit (DES) 10. As shown in the same structure in FIG. 2, this disk enclosure unit (DES) 10 includes, a backboard (BB) 8, and the connectors 9, 19, 20, 30. The connectors 9, 19, 20, 30 are respectively connecting two power supply units (PS0, PS1) 7, 17 and two adapter cards (ADP0, ADP1) 41, 42 (PS0, PS1, ADP0, ADP1) to the backboard (BB) 8. This structure allows power to be continually supplied even if one unit among the power supply units (PS0, PS1) 7, 17 and adapter cards (ADP0, ADP1) 41, 42 becomes defective.

Figure 2:
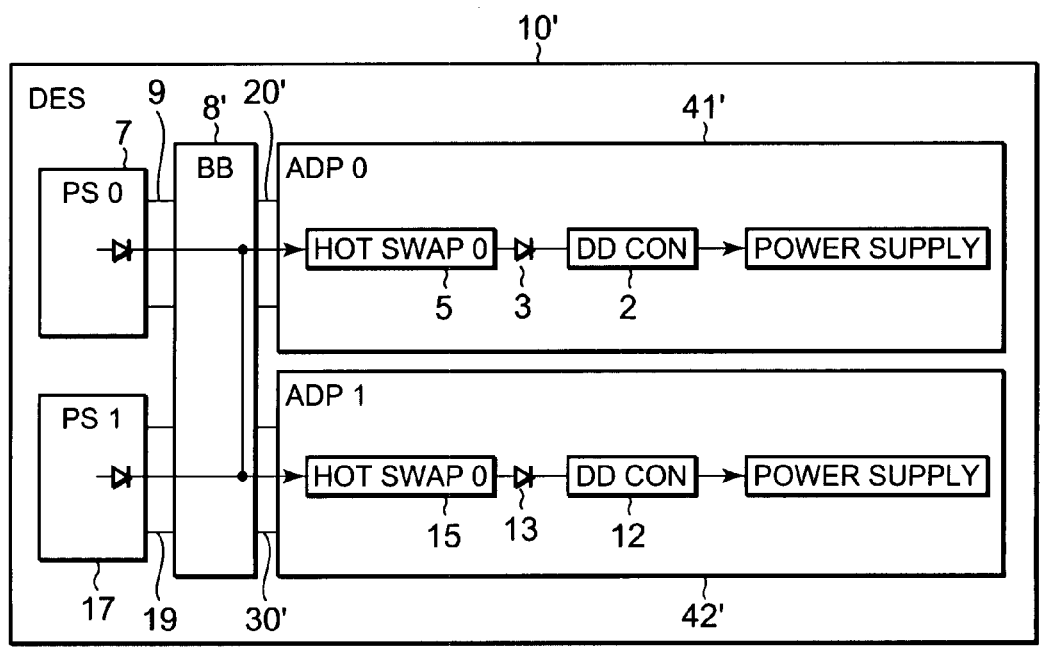
FIG. 2 is a circuit block diagram showing the basic structure of the power supply of the related art for use in disk enclosure devices.

In this disk enclosure unit (DES) 10, the structure of the two adapter cards (ADP0, ADP1) 41, 42 is different from the adapter cards (ADP0, ADP1) 41', 42' of the dual system for the disk enclosure unit (DES) 10' described using FIG. 2.

In other words, the adapter card (ADP0) 41 has a pair of hot swap circuits (HOT SWAP0, HOT SWAP1) 5, 6. And the adapter card (ADP0) 42 has a pair of hot swap circuits (HOT SWAP0, HOT SWAP1) 15, 16. Consequently, there are dual (or redundant) hot swap circuits on each of the adapter cards. Besides the diodes 3, 4 being connected to the respective hot swap circuits (HOT SWAP0, HOT SWAP1) 5, 6, the output sides of these diodes 3, 4 are mutually connected to each other and to the input side of the DC/DC converter (DD CON) 2 that carries out DC to DC conversion for supplying the specified power to the rear stages. Power is then supplied from the output side of the DC/DC converter (DD CON) 2. Besides the diodes 13, 14 being connected to the respective hot swap circuits (HOT SWAP0, HOT SWAP1) 15, 16, the output sides of these diodes 13, 14 are mutually connected to each other and to the input side of the DC/DC converter (DD CON) 12 that carries out DC to DC conversion for supplying the specified power to the rear stages. Power is then supplied from the output side of the DC/DC converter (DD CON) 12.

The backboard (BB) 8 contains a power supply line pattern for supplying power from a power supply unit (PS0) 7 to a hot swap circuit (HOT SWAP0) 5, 15 of each of the adapter cards (ADP0, ADP1) 41, 42, and power from the other power supply unit (PS1) 17 to the other hot swap circuit (HOT SWAP0) 6, 16 of each of the adapter cards (ADP0, ADP1) 41, 42.

The first power supply system uses the connector 9 which connects the backboard (BB) 8 and one power supply unit (PS0) 7. The second power supply system uses the connector 19 which connects the backboard (BB) 8 and another power supply unit (PS1) 17. And two power supply systems use the connector 20 which connects one adapter card (ADP0) 41 and the backboard (BB) 8, and connector 30 which connects another adapter card (ADP1) 42 and the backboard (BB) 8. So the power supply line patterns formed on the backboard (BB) 8 described above include a pattern that branches from each of the connectors 9, 19 to the both of connectors 20, 30.

In a disk enclosure unit (DES) 10 with this type of structure, the power from the power supply circuit unit (PS0) 7 supplied via the connector 9 is branched at the power supply line pattern on the backboard (BB) 8, and is sent via the connectors 20, 30 to the hot swap circuit (HOT SWAP0) 5 of the adapter card (ADP0) 41 and the hot swap circuit (HOT SWAP0) 15 of the adapter card (ADP1) 42. Power from the power supply circuit unit (PS1) 17 supplied via the connector 19 branches in the same way at the power supply line pattern on the backboard (BB) 8, and is sent via the connectors 20, 30 to the hot swap circuit (HOT SWAP1) 6 of the adapter card (ADP0) 41 and the hot swap circuit (HOT SWAP1) 16 of the adapter card (ADP1) 42.

The operation in this disk enclosure unit (DES) 10 when a breakdown occurs in one of the connectors 9, 19, 20, and 30 will now be described.

When a pin in the connector 9 possessing insertable/detachable pins in the power supply circuit unit (PS0) for example becomes bent, and causes an electrical short between the power supply and GND, the power supply circuit unit (PS0) 7 detects the excessive current and stops the power output so that the supply of power to the hot swap circuit (HOT SWAP0) 5 of adapter card (ADP0) 41 and the hot swap circuit (HOT SWAP0) 15 of adapter card (ADP1) 42 stops. However, since the power supply circuit unit (PS1) 17 possesses a redundant structure, power continues to be supplied to the hot swap circuit (HOT SWAP1) 6 of adapter card (ADP0) 41 and the hot swap circuit (HOT SWAP1) 16 of adapter card (ADP1) 42. Operation of the disk device therefore continues. Consequently, operation of the entire device can continue due to the redundant structure.

In the same way, even if a pin in the connector 19 possessing insertable/detachable pins in the power supply circuit unit (PS1) 17 for example becomes bent, and causes an electrical short between the power supply and GND, the power supply circuit unit (PS1) 17 detects the excessive current and stops the power output so that the supply of power to the hot swap circuit (HOT SWAP0) 6 of adapter card (ADP0) 41 and the hot swap circuit (HOT SWAP1) 16 of adapter card (ADP1) 42 stops. However, since the power supply circuit unit (PS0) 7 possesses a redundant structure, power continues to be supplied to the hot swap circuit (HOT SWAP0) 5 of adapter card (ADP0) 41 and the hot swap circuit (HOT SWAP0) 15 of adapter card (ADP1) 42. Operation of the disk device therefore continues. Consequently, operation of the entire device can continue due to the redundant structure.

On the other hand, when a pin in the connector 20 that supplies power to the hot swap circuit (HOT SWAP0) 5 of the adapter card (ADP0) 41 becomes bent, and causes an electrical short between the power supply and GND, then the power supply circuit unit (PS0) 7 detects the excessive current and stops the power output so that the supply of power to the hot swap circuit (HOT SWAP0) 5 of adapter card (ADP0) 41 and the hot swap circuit (HOT SWAP0) 15 of adapter card (ADP1) 42 stops. However since the power supply circuit unit (PS1) 17 possesses a redundant structure, power continues to be supplied to the hot swap circuit (HOT SWAP 1) 6 of adapter card (ADP0) 41 and the hot swap circuit (HOT SWAP1) 16 of adapter card (ADP1) 42. Operation of the disk device therefore continues. Consequently, operation of the entire device can continue due to the redundant structure.

Likewise, even if a pin in the connector 20 that supplies power to the hot swap circuit (HOT SWAP1) 6 of the adapter card (ADP0) 41 becomes bent, and causes an electrical short between the power supply and GND, the power supply circuit unit (PS1) 17 detects the excessive current and stops the power output so that the supply of power to the hot swap circuit (HOT SWAP1) 6 of adapter card (ADP0) 41 and the hot swap circuit (HOT SWAP1) 16 of adapter card (ADP1) 42 stops. However since the power supply circuit unit (PS0) 7 possesses a redundant structure, power continues to be supplied to the hot swap circuit (HOT SWAP0) 5 of adapter card (ADP0) 41 and the hot swap circuit (HOT SWAP0) 15 of adapter card (ADP1) 42. Operation of the disk device therefore continues. Consequently, operation of the entire device can continue due to the redundant structure.

If on the other hand, a pin in the connector 30 that supplies power to the hot swap circuit (HOT SWAP0) 15, of the adapter card (ADP1) 42 becomes bent, and causes an electrical short between the power supply and GND, then the power supply circuit unit (PS0) 7 detects the excessive current and stops the power output so that the supply of power to the hot swap circuit (HOT SWAP0) 5 of adapter card (ADP0) 41 and the hot swap circuit (HOT SWAP0) 15 of adapter card (ADP1) 42 stops. However since the power supply circuit unit (PS1) 17 possesses a redundant structure, power continues to be supplied to the hot swap circuit (HOT SWAP1) 6 of adapter card (ADP0) 41 and the hot swap circuit (HOT SWAP1) 16 of adapter card (ADP1) 42. Operation of the disk device can therefore continue. Consequently, operation of the entire device can continue due to the redundant structure.

If however a pin in the connector 30 that supplies power to the hot swap circuit (HOT SWAP1) 16 of the adapter card (ADP1) 42 becomes bent, and causes an electrical short between the power supply and GND, then the power supply circuit unit (PS1) 17 detects the excessive current and stops the power output so that the supply of power to the hot swap circuit (HOT SWAP1) 6 of adapter card (ADP0) 41 and the hot swap circuit (HOT SWAP1) 16 of adapter card (ADP1) 42 stops. However since the power supply circuit unit (PS0) 7 possesses a redundant structure, power continues to be supplied to the hot swap circuit (HOT SWAP1) 5 of adapter card (ADP0) 41 and the hot swap circuit (HOT SWAP1) 15 of adapter card (ADP1) 42. Operation of the disk device can therefore continue. Consequently, operation of the entire device can continue due to the redundant structure.

The power supply device of this invention is not limited to disk enclosure devices and may be applied to all types of devices requiring a stable supply of power such as computers, control devices, and measuring devices.

The present invention is not limited to the embodiment described above. For example, to give more redundancy, thus more stable supply, the power supply device with any plural number, exemplary 3 or 4, of power supply units, adapter cards and hot swap circuits on an adapter card can be embodied by this invention.

What is claimed is:

1. A power supply device comprising:
   at least two power supply units and a same number of adapter cards, each of said adaptor cards comprising a number of hot swap circuits at least equal to a number of said power supply units;
   a backboard to which each of said at least two supply units and each of said adaptor cards is connected via a respective connector; and
   plural power supply lines on said backboard, each of said power supply lines starting from a respective different one of said at least two power supply units and branching to each of said adaptor cards, each of said hot swap circuits receiving an input only from a respective one of said plural power supply lines.

2. The power supply device according to claim 1, wherein an output of each of said hot swap circuits within each of said adapter cards is connected to a respective diode and thereafter connected with each other.

3. A disk enclosure device comprising said power supply device according to claim 2.

4. A disk enclosure device comprising said power supply device according to claim 1.

5. A power supply method comprising:
   supplying power from each of at least two power supply units to a respective one of a number of hot swap circuits within each of a number of adapter cards, wherein the number of hot swap circuits within each adaptor card is greater than or equal to the number of power supply units and the number of adaptor cards is equal to the number of power supply units, and wherein power is supplied to the hot swap circuits via a backboard that includes plural power supply lines, each of the power supply lines supplying power from a respective different one of the at least two power supply units to each of the adaptor cards and each of the hot swap circuits receiving an input only from a respective one of the plural power supply lines.

6. The power supply method according to claim 5, wherein each of said at least two of power supply units and each of said adaptor cards is connected to the back board via a respective connector.

7. The power supply method according to claim 5, each of said hot swap circuits within each of said adaptor cards is connected to a respective diode and thereafter connected with each other.

* * * * *